United States Patent [19]

Dumbaugh, Jr. et al.

[11] Patent Number: 4,855,260

[45] Date of Patent: Aug. 8, 1989

[54] GLASSES EXHIBITING LOW THERMAL COEFFICIENTS OF ELASTICITY

[75] Inventors: William H. Dumbaugh, Jr.; Henry E. Hagy, both of Painted Post, N.Y.

[73] Assignee: Corning Incorporated, Corning, N.Y.

[21] Appl. No.: 216,850

[22] Filed: Jul. 8, 1988

[51] Int. Cl.$^4$ .............................................. C03C 3/091
[52] U.S. Cl. .......................................... 501/66; 501/60
[58] Field of Search .......................................... 501/66

[56] References Cited

U.S. PATENT DOCUMENTS 2,392,314  3/1943  Dalton ................................... 106/54
3,506,385  4/1970  Weber et al. ........................... 501/66

OTHER PUBLICATIONS

"Microweighing Goes On Line In Real Time," H. Patashnick and G. Rupprecht, *Research and Development*, pp. 74–78 (Jun. 1986).

"Temperature Dependence of the Shear Modulus and Attenuation of Ultrasound in Silicate Glasses," V. S. Postnikov et al., *Ivz. Akad. Naukd. SSSR, Neorg. Matr.*, 7 (3) pp. 485–489 (1971).

*Primary Examiner*—Mark L. Bell
*Attorney, Agent, or Firm*—Kees van der Sterre

[57] ABSTRACT

Glasses exhibiting low thermal coefficients of elastic modulus, good glass stability, low thermal expansion, and good chemical durability are provided, a first glass type including glasses consisting essentially, in weight percent on the oxide basis, of about 60–64% $SiO_2$, 14–18% $B_2O_3$, 8.5–10% $Al_2O_3$, 4–7% $Na_2O$, and 2–12% BaO, and a second group comprising alkali silicate glasses consisting essentially, in weight percent on the oxide basis, of about 51–55% $SiO_2$, 10–13% $K_2O$, 5–15% ZnO, 5–15 BaO, and 10–20% PbO.

1 Claim, No Drawings

GLASSES EXHIBITING LOW THERMAL COEFFICIENTS OF ELASTICITY

BACKGROUND OF THE INVENTION

The present invention relates to alkali silicate glasses, and more particularly to alkali silicate and alkali borosilicate glasses exhibiting low thermal coefficients of elastic modulus in combination with good glassworking characteristics.

As is well known, glasses share a common characteristic with most other solid materials in exhibiting an elastic modulus which varies depending upon the temperature of the glass. As is also known, the extent of this dependence can vary substantially depending upon the composition of the glass and the temperature regime over which the elastic modulus of the glass is measured. Thus V. S. Postnikov et al., in "Temperature Dependence of the Shear Modulus and Attenuation of Ultrasound in Silicate Glasses," *Izv. Akad. Naukd. SSSR, Neorg. Matr.*, 7 [3] pages 485–489 (1971) report a large positive thermal coefficient of shear modulus with temperature for fused quartz, and also describe glasses in the $SiO_2$—$K_2O$—$ZnO$—$BaO$—$PbO$ composition system which exhibit relatively low thermal coefficients of shear modulus over the temperature range $-160°$ to $+160°$ C.

Glasses exhibiting a low thermal coefficient of elastic modulus are useful for a variety of applications wherein glasses which do not change in elasticity with changes in ambient temperature are needed. Examples of products requiring glasses with a low thermal coefficient of elastic modulus include those wherein the acoustic propagation characteristics of the glass are critical, and those wherein the detection and measurement of a deflection in a glass element is used to provide an indication of a mass or applied stress.

Specific uses for glasses with temperature-invariant properties include their use to make glass components for inertial balances such as described, for example, by H. Patashnick and G. Rupprecht in "Microweighing Goes On Line in Real Time," *Research and Development*, pages 74–78 (June 1986). In this application, the elastic modulus of the glass is critical because an attached mass is determined from the frequency of a vibrating glass mass-collecting element. Changes in the elastic modulus of this element with temperature also change the vibration frequency and thus introduce error into the weighing process.

While some of the glasses disclosed by Postnikov et al. exhibit relatively temperature-independent elastic modulus behavior, these glasses are generally quite unstable and therefore very difficult to melt and form into products without devitrification. Thus to our knowledge no commercial application has been found for these glasses.

Commercial glasses which inherently exhibit relatively low thermal coefficients of elasticity are also known. U.S. Pat. No. 2,392,314, for example, describes glasses consisting essentially of 60–75% $SiO_2$, 10–20% $B_2O_3$, 10–15% $BaO$ and/or $CaF_2$, and 5–10% $Al_2O_3$, and also comprising an alkali metal oxide component including up to about 5% $K_2O$, up to about 2% $Li_2O$, and up to 3% $Na_2O$.

Glasses of this type were originally developed for sealing to cobalt nickel alloys. A related glass, Corning Code 7052 glass, which is commercially sold for this application, exhibits a relatively low thermal coefficient of elastic modulus at ambient temperatures. Further, in contrast to the glasses of Postnikov et al., this glass exhibits excellent working characteristics.

Unfortunately, however, even these commercial compositions do not exhibit very low thermal coefficients of elastic modulus. Hence glasses having thermal coefficients on the order of 20% or less of that of Corning Code 7052 glass would be preferred for many of these applications.

Desirable characteristics of glasses to be used for technical applications such as above described further include, in addition to acceptable glass-working behavior, good dimensional stability, a low coefficient of thermal expansion, and good chemical durability.

It is therefore a principal object of the present invention to provide glasses of novel composition which exhibit lowered thermal coefficients of elastic modulus in combination with good glass working characteristics, high dimensional stability, a low thermal expansion coefficient and good chemical durability.

Other objects and advantages of the invention will become apparent from the following description thereof.

SUMMARY OF THE INVENTION

The present invention provides glasses exhibiting thermal coefficients of elastic modulus which are well below those of the the commercial glasses, and which in addition offer good glass stability, low thermal expansion, and good chemical durability. Glasses satisfying these characteristics are generally of two distinct types. The first type, preferred from the standpoint of glass stability and workability, includes glasses consisting essentially in weight percent on the oxide basis, of about 60–64% $SiO_2$, 14–18% $B_2O_3$, 8.5–10% $Al_2O_3$, 4–7% $Na_2O$, and 2–12% $BaO$.

A second group of glasses, also exhibiting lowered thermal coefficients of elastic modulus but slightly less favorable glass-working characteristics than the preferred glasses, comprises alkali silicate glasses containing $ZnO$, $BaO$, and $PbO$ as principal modifying constituents. These glasses consist essentially, in weight percent on the oxide basis, of about 51–55% $SiO_2$, 10–13% $K_2O$, 5–15% $ZnO$, 5–15% $BaO$, and 10–20% $PbO$. While exhibiting somewhat higher thermal expansion coefficients and being less preferred from the standpoint of workability, these compositions still combine adequate workability with a low thermal coefficient of elasticity and reasonable chemical durability.

The glasses of the invention have utility for a variety of uses, including utility for inertial balance elements as described by H. Patashnick et al. above. However such balances and elements form no part of the present invention, and reference should be made to the copending application of H. Patashnick and G. Rupprecht entitled "Novel Glass Elements for Use In Balances", Ser. No. 07/216,812, filed concurrently herewith, for a further description thereof.

DETAILED DESCRIPTION

Techniques for measuring the thermal coefficient of elastic modulus of a glass are known. For example, as disclosed by Postnikov et al., the velocity of an ultrasound wave in a glass sample depends on the shear modulus of the glass, and can be measured at various temperatures to evaluate the thermal coefficient of shear modulus or elastic modulus for that glass.

A present need for glasses having a low temperature coefficient of elastic modulus is in the manufacture of inertial balances. These balances typically comprise an oscillating system consisting of elastic glass members, wherein the resonance frequency of the oscillating system depends upon the mass deposited on a substrate surface.

Of course as the elastic modulus of the elastic members of the oscillating system changes with temperature, the resonant frequency changes, even though the mass on the substrate table is unchanged. Therefore, an error in the mass determination is introduced which must be accounted for.

Practical requirements for glasses for these and other applications have been identified. If possible, the glass should exhibit a normalized temperature coefficient of elastic modulus averaging less than about 10 ppm./°C. over a projected use temperature range perhaps as large as −50° C. to +150° C. Thus coefficients of less than 20% and preferably less than 10% of that of Corning Code 7052 glass are needed. The latter glass, which contains about 63% $SiO_2$, 19% $B_2O_3$, 7.5% $Al_2O_3$, 0.65% $Li_2O$, 2.15% $Na_2O$, 3.2% $K_2O$, 2.7% BaO and 0.6% F, has a normalized temperature coefficient of elastic modulus of about 62 ppm./°C. at 50° C. and an average coefficient of thermal expansion (0°-300° C.) of about $46 \times 10^{-7}$/°C.

Secondly, the glass must be readily formable into inertial balance elements or other shaped glass products simply by heating in a flame and reshaping, without any loss in glass quality. In other words, the glass must exhibit excellent lampworking characteristics.

Thirdly, the glasses must exhibit excellent dimensional stability, and will preferably demonstrate a relatively low coefficient of thermal expansion so as to provide stable physical dimensions in use. And finally the glasses should exhibit reasonable chemical durability, particularly for applications requiring exposure of the glass to corrosive environments.

Examples of glasses which have been found to meet these requirements are reported in Table I below. Melts of the glasses reported in Table I may be conveniently compounded in 1000 gram batches, with the batches then being tumble mixed to assure melt homogeneity. The batches may then be melted in platinum crucibles in an electric furnace, with melting being carried out over a 4 hour interval at 1550° C. The melts are then stirred for 15 minutes and allowed to soak at 1550° C. for an additional one and one-half hours before casting into slabs. The glasses are finally annealed at 500° C.

TABLE I

|  | 1 | 2 | 3 | 4 | 5 |
| --- | --- | --- | --- | --- | --- |
| $SiO_2$ | 63.4 | 63.5 | 60.6 | 63.3 | 60.3 |
| $B_2O_3$ | 16.7 | 15.4 | 14.7 | 17.3 | 16.5 |
| $Al_2O_3$ | 9.35 | 9.36 | 8.94 | 9.69 | 9.24 |
| $Li_2O$ | — | — | — | — | — |
| $Na_2O$ | 4.93 | 6.13 | 4.72 | 6.95 | 5.46 |
| $K_2O$ | — | — | — | — | — |
| BaO | 5.61 | 5.62 | 10.98 | 2.77 | 8.44 |

Table II below reports values of normalized thermal coefficient of elastic modulus (hereinafter simply normalized elastic modulus or NEM) for the glasses reported about in Table I. The values given are as determined at 50° C. These values represent a substantial improvement over the NEM value of 62 ppm/°C. for Corning Code 7052 glass.

TABLE II

| Composition | 1 | 2 | 3 | 4 | 5 |
| --- | --- | --- | --- | --- | --- |
| NEM(ppm/°C.) @ 50° C. | 8.8 | 1.8 | −4.4 | −3.0 | 6.8 |

Not surprisingly, the composition of the glass is found to critically affect the elastic and other physical properties thereof. Hence, glasses close in composition to those within the scope of the invention but outside the ranges specified will generally not exhibit the combination of properties needed for present applications requiring easily workable low thermal coefficient of elastic modulus glasses.

Table III below reports a number of related alkali silicate glass compositions which do not meet the requirement for a low thermal coefficient. The compositions reported include the previously preferred commercial glass (Code 7052), as well as compositional variations thereupon designed to modify glass properties of the glass without destabilizing the glass or affecting other essential properties thereof. Also included in Table III for each of the glasses shown is the normalized elastic modulus (NEM) of the glass as determined at 50° C.

TABLE III

|  | Code 7052 | 6 | 7 | 8 | 9 |
| --- | --- | --- | --- | --- | --- |
| $SiO_2$ | 63.1 | 64.5 | 67.0 | 65.5 | 64.9 |
| $B_2O_3$ | 19.0 | 19.4 | 17.1 | 19.4 | 17.1 |
| $Al_2O_3$ | 7.5 | 7.66 | 7.55 | 6.64 | 9.58 |
| $Li_2O$ | 0.65 | — | — | — | — |
| $Na_2O$ | 2.15 | 5.72 | 5.64 | 5.71 | 5.66 |
| $K_2O$ | 3.20 | — | — | — | — |
| BaO | 2.70 | 2.77 | 2.73 | 2.76 | 2.74 |
| F | 0.6 | — | — | — | — |
| NEM (ppm/°C.) @ 50° C. | 62 | 37.8 | 33.0 | 42.4 | 17.0 |

Referring more particularly to the compositions in Table III, Glass 6 represents an improvement over Code 7052 glass with respect to normalized elastic modulus, due to the elimination of mixed alkalis therefrom. This modification has the further advantage of improving the dimensional stability of the glass in the high temperature regime below the glass strain point. However, the normalized elastic modulus of this all-sodium glass is clearly still too high to be acceptable.

Lowering the boric oxide level as in Glass 7 results in a slight further improvement in nomalized elastic modulus, with some additional benefit being obtained by substituting alumina for silica as seen in Glasses 8 and 9. However, continued substitution of this nature is not useful because it rapidly degrades the stability of the glass against crystallization and thus the working characteristics of the glass.

In fact, low values for the normalized elastic modulus in combination with good glassworking characteristics and other desired properties are ultimately achieved in this system by replacing some of the $Na_2O$ with barium oxide, with a general increase in sodium and/or barium oxide content at the expense of silica and/or boric oxide also being employed. Examples of the resulting glasses and their properties are shown in Tables I and II; all of these glasses may be easily lampworked into any desired shape and have acceptable chemical durability.

The presently preferred glass in accordance with the invention is Glass 3 in Table I. This glass substantially exceeds the requirement for a low normalized elastic modulus value and additionally is found to exhibit zero NEM at approximately 34° C. Composition and property data for Glass 3 are shown in Table IV below. Included in Table IV in addition to the oxide composition for this glass are a preferred batch composition for the glass and a listing of the physical properties thereof.

TABLE IV

| Oxide Composition (weight %) | | Batch Material (weight, grams) | |
| --- | --- | --- | --- |
| $SiO_2$ | 60.6 | 200 mesh Supersil Sand | 607 |
| $B_2O_3$ | 14.7 | Boric Oxide | 149.5 |
| $Al_2O_3$ | 8.94 | Alumina | 88.9 |
| $Na_2O$ | 4.72 | Soda Ash | 61.7 |
| BaO | 11.0 | Barium Carbonate | 142.6 |
| | | Sodium Nitrate | 30 |
| Physical Properties | | | |
| Softening Point: | | 770° C. | |
| Annealing Point: | | 579° C. | |
| Strain Point: | | 537° C. | |
| Expansion Coefficient: (25-300° C.) | | $49.9 \times 10^{-7}/°C.$ | |
| Density: | | 2.479 g/cm$^3$ | |

As previously noted, a study by V. S. Postnikov et al., *Izv. Akad. Nauk SSSR, Neorg. Mater.*,7 [3], 485-489 (1971), had identified a group of glass compositions in the $K_2O$—PbO—BaO—ZnO—$SiO_2$ system exhibiting a low thermal coefficient of shear modulus. Compositions 10 and 11 in Table V below are representative of these glasses, the compositions being reported in weight percent but with molar compositions being reported in parentheses. While low in thermal coefficient of elastic modulus, the data in Table V indicate that these glasses are also difficult or impossible to lampwork. Thus Glass 10 in Table V exhibits difficult to unsatisfactory lampworking characteristics while Glass 11 devitrified during lampworking.

TABLE V

| Oxide | 10 | 11 | 12 |
| --- | --- | --- | --- |
| $SiO_2$ | 54.1 (70) | 45.4 (65) | 53.6 |
| $K_2O$ | 6.05 (5) | 5.48 (5) | 12.0 |
| ZnO | 15.7 (15) | 14.2 (15) | 10.4 |
| BaO | 9.85 (5) | 8.92 (5) | 9.77 |
| PbO | 14.3 (5) | 26.0 (10) | 14.2 |
| Soft. Pt. (°C.) | 803 | — | 761 |

TABLE V-continued

| Oxide | 10 | 11 | 12 |
| --- | --- | --- | --- |
| Ann. Pt. (°C.) | 597 | 551 | 559 |
| Str. Pt. (°C.) | 552 | 509 | 514 |
| C.T.E. $\times 10^7$(/°C.) (25-300° C.) | 61.5 | 68.3 | 76.0 |
| Density (g/cm$^3$) | 3.201 | 3.586 | 3.092 |
| NEM @ 50° C.,(ppm/°C.) | | | −4.4 |
| Lampworking Characteristics | difficult to unsatis. | devitrified | satisfactory |

In contrast to the glasses reported by Postnikov et a., Glass 12 in Table V exhibits imporved stability manifested by satisfactory lampworking characteristics while still retaining a low thermal coefficient of elastic modulus. Thus Glass 12 exhibits an NEM value of −8.8 ppm/°C., and glasses close to that composition will exhibit similarly low values for this parameter.

The combination of characteristics shown by Glass 12 and closely related glasses is attributed to somewhat reduced ZnO levels in combination with increased amounts of $K_2O$ as compared with the Postnikov et al. glasses. Thus, for glasses of this general type, compositions consisting essentially, in weight percent on the oxide basis, of about 51-55% $SiO_2$, 10-13% $K_2O$, 5-15% ZnO, 5-15 % BaO and 10-20% PbO, are presently considered suitable for the manufacture of workable glasses exhibiting low temperature coefficients of elastic modulus. Compositions which are higher in ZnO and/or BaO or lower in $SiO_2$ and/or $K_2O$ have demonstrated inferior lampworking characteristics as well as, in many cases, a larger temperature dependence of elastic modulus on temperature than the preferred compositions.

While the compositions of the invention will have principal use for applications such as inertial balances involving critical elastic properties, it will be apparent to those skilled in the art that numerous other uses for such glasses exist or will be developed. Thus it is intended that the invention be limited only by the scope of the appended claims.

We claim:

1. A glass consisting essentially, in weight percent on the oxide basis, of about 60-64% $SiO_2$, 14-18% $B_2O_3$, 8.5-10% $Al_2O_3$, 4-7% $Na_2O$, and 2-12% BaO, said glass exhibiting an average normalized thermal coefficient of elastic modulus over the temperature range −50°-+150° C. which does not exceed about 10 ppm./°C.

* * * * *